(12) United States Patent
Brophy et al.

(10) Patent No.: US 6,672,369 B1
(45) Date of Patent: Jan. 6, 2004

(54) SEMI-MODULAR ROTOR MODULE

(75) Inventors: Mark E. Brophy, Wellsville, NY (US); Robin B. Rhodes, Wellsville, NY (US); Michael Zakel, Wellsville, NY (US); Jon R. Cowburn, Ulysses, PA (US)

(73) Assignee: Alstom (Switzerland) Ltd, Baden (CH)

( * ) Notice: Subject to any disclaimer, the term of this patent is extended or adjusted under 35 U.S.C. 154(b) by 0 days.

(21) Appl. No.: 10/375,732

(22) Filed: Feb. 27, 2003

(51) Int. Cl.[7] ............................................. F23L 15/02
(52) U.S. Cl. ................................. 165/8; 165/10; 165/4
(58) Field of Search ............................... 165/8, 9, 10, 4

(56) References Cited

U.S. PATENT DOCUMENTS

| | | | | |
|---|---|---|---|---|
| 1,762,320 A | * | 6/1930 | Wood ............................. | 165/8 |
| 3,216,486 A | * | 11/1965 | Hall et al. ..................... | 165/8 |
| 3,267,562 A | * | 8/1966 | Chiang et al. ................. | 165/8 |
| 3,789,916 A | * | 2/1974 | Lindahl ......................... | 165/8 |
| 3,830,287 A | * | 8/1974 | Eisenstein .................... | 165/10 |
| 3,891,029 A | * | 6/1975 | Mahoney ....................... | 165/8 |
| 5,615,732 A | * | 4/1997 | Brophy et al. ................ | 165/8 |
| 5,836,378 A | * | 11/1998 | Brophy et al. ................ | 165/8 |
| 6,422,299 B1 | * | 7/2002 | Eriksson ....................... | 165/8 |

* cited by examiner

Primary Examiner—Christopher Atkinson
(74) Attorney, Agent, or Firm—Russell W. Warnock

(57) ABSTRACT

A semi-modular rotor module for an air preheater having a circular rotor includes a lug assembly having a lug front, a lug back spaced radially outward from the lug front, and cold end and hot end lug members. The lug front and lug back each extend longitudinally from a first end to a second end, with the cold end lug member being mounted to the first ends of the lug front and the lug back and the hot end lug member being mounted to the second ends of the lug front and the lug back. A single main diaphragm extends radially from an inner end portion to an outer end portion, with the inner end portion being mounted to the lug front on a first side of the lug assembly. The outer end portion is mounted to a rotor shell which is spaced radially outward from the lug back. At least one intermediate diaphragm extends radially from an inner end portion, mounted to the lug back at a position intermediate the first and second sides of the lug assembly, to an outer end portion mounted to the rotor shell.

13 Claims, 6 Drawing Sheets

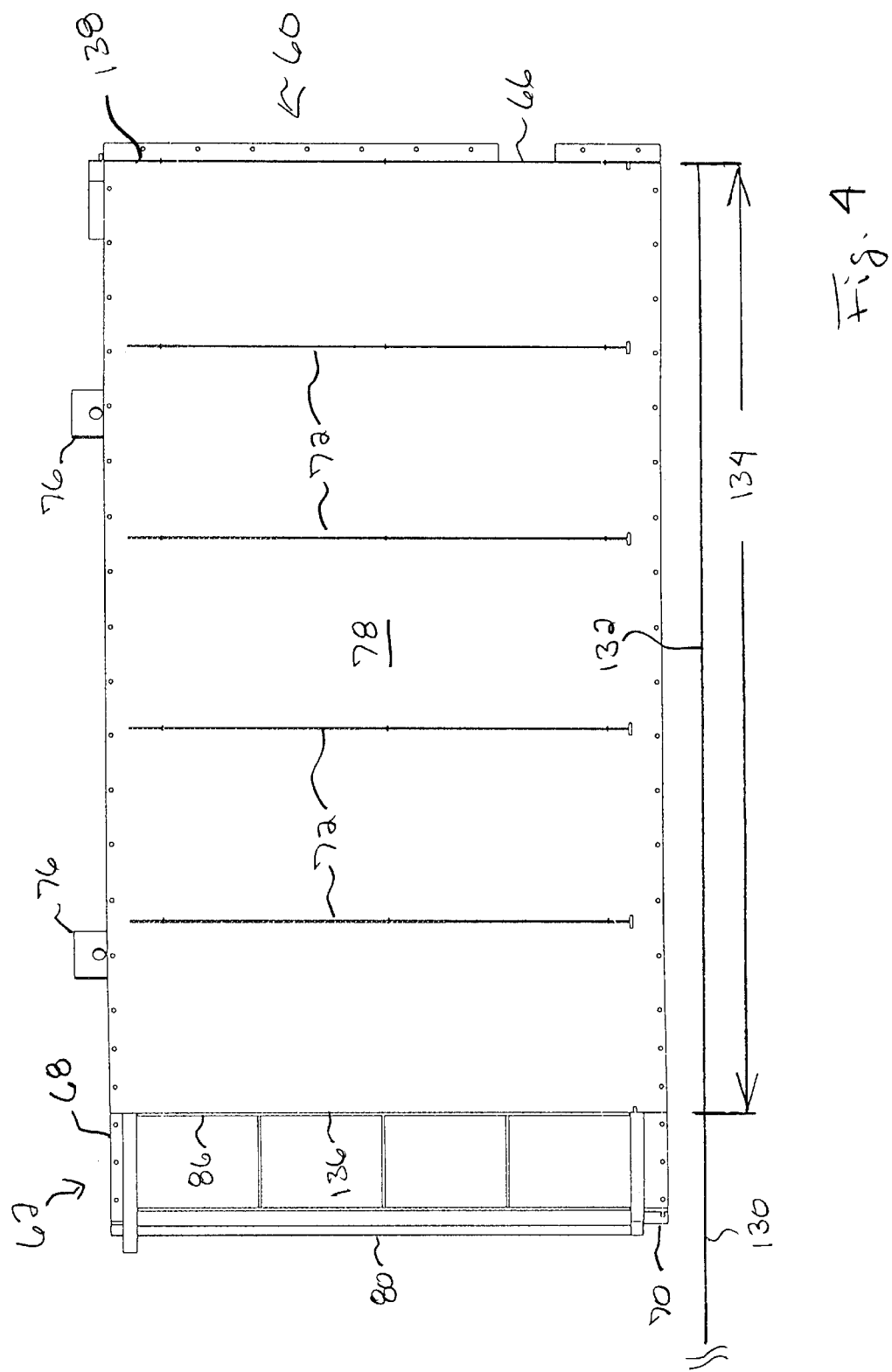

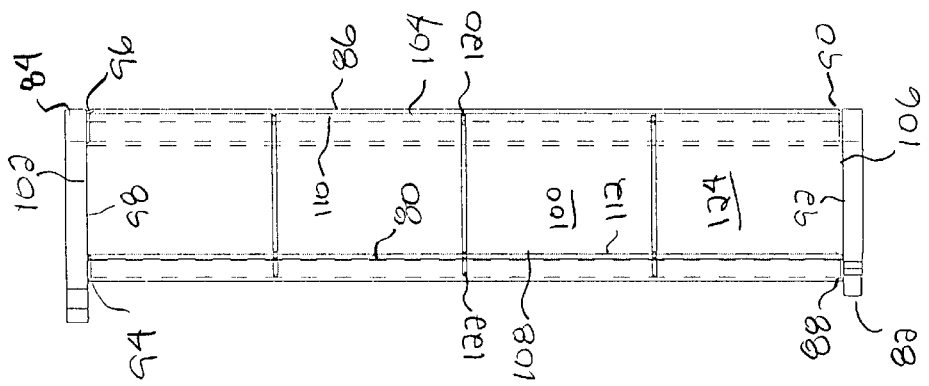

SEMI-MODULAR ROTOR MODULE

BACKGROUND OF THE INVENTION

The present invention relates to rotary regenerative heat exchangers generally used as air preheaters and more specifically to rotary regenerative heat exchangers having a semi-modular rotor construction.

A rotary regenerative heat exchanger is employed to transfer heat from one hot gas stream, such as a hot flue gas stream, to another cold gas stream, such as combustion air. The rotor contains a mass of heat absorbent material which first rotates through a passageway for the hot gas stream where heat is absorbed by the heat absorbent material. As the rotor continues to turn, the heated absorbent material enters the passageway for the cold gas stream where the heat is transferred from the absorbent material to the cold gas stream.

In a traditional rotary heat exchanger, the cylindrical rotor is disposed on a vertical central rotor post and divided into a plurality of sector-shaped compartments by a plurality of radial partitions, referred to as diaphragms, extending from the rotor post to the outer peripheral shell of the rotor. These sector-shaped compartments are loaded with modular heat exchange baskets which contain the mass of heat absorbent material commonly formed of stacked plate-like elements.

The rotors of such heat exchangers are either formed as non-modular rotors or as modular rotors. The non-modular rotors comprise a series of diaphragm plates each attached to the rotor post and extending out to the rotor shell thereby dividing the rotor into sectors. Further, each sector is divided into a number of compartments by stay plates extending between the diaphragms at spaced intervals. The modular heat exchange baskets are then loaded axially into these compartments from the top end. The non-modular rotors are field labor intensive because all of the heat transfer surface is field installed. Further, more structural welds are required to field assemble non-modular rotors. The result is more total time to field install the heat exchanger rotor structure.

Modular rotors are composed of a series of shop-assembled sector modules which are then field-assembled into a complete rotor. Each sector module has a diaphragm plate on each side with these two diaphragms being joined by stay plates. The heat transfer surface of the sector modules is also shop installed. When these modules are assembled into a rotor in the field, the diaphragm plates of adjacent modules are joined together to form a double plated diaphragm. Although the modular rotors require less time to field-install than non-modular rotors, they require twice as many individual diaphragm plates which take up gas flow area and allow less heat transfer area for the same size rotor and post diameter. Also, they are component intensive because of all the parts necessary to pin the adjacent modules to each other at diaphragm locations.

Most modular and non-modular rotor designs contain stay plates as previously described. The stay plates reinforce the rotor structure and support the baskets. Because the baskets are inserted axially and must fit in the stay plate compartments, the baskets must be undersized for easy installation and removal. Undersizing involves providing a gap around the perimeter of each basket. This reduces the free area of the basket available for heat transfer flow and creates flow bypass gaps around the baskets. The result is decreased air preheater efficiency and the selection of larger air preheaters for any particular performance requirements.

In U.S. Pat. No. 5,615,732, a rotor having a semi-modular construction is described. The rotor is fabricated from a combination of shop assembled sector modules and field assembled components in a way to eliminate the double plate diaphragms of the normal modular rotors and thereby maximize the internal volume of the preheater which is available for heat transfer surface. The shop assembled modules comprise one or more sectors, depending primarily on the rotor size, with the field assembled components fitting between spaced shop assembled modules. The semi-modular rotor may further eliminate the stay plates, substituting support gratings which extend between the diaphragms and form open supports on which the baskets are supported. The baskets are loaded into the sectors radially, instead of axially. This eliminates the need for gaps around the baskets and the undersizing of the baskets. These support gratings are part of the shop assembled modules and also are a part of the field assembled components which actually facilitate the field assembly.

Although the semi-modular rotor construction maximizes the space available for heat transfer surface, such construction requires that a significant amount of field-erection time be dedicated to assembling half of the rotor structure and installing half of the heat-transfer surface. The use of field-labor increases the cost of the air preheater, since field-labor is more expensive than shop-labor. In addition, field-labor cannot assemble components as precisely as shop labor due to the absence of shop fixtures. Accordingly, there is an increased risk of assembly related errors which require later rework.

SUMMARY OF THE INVENTION

Briefly stated, the invention in a preferred form is a semi-modular rotor module for an air preheater having a circular rotor. The rotor module comprises a lug assembly including a lug front and a lug back spaced radially outward from the lug front. The lug front and lug back each extend longitudinally from a first end to a second end. The lug assembly also includes a cold end lug member mounted to the first ends of the lug front and the lug back and a hot end lug member mounted to the second ends of the lug front and the lug back. The lug front, lug back, cold end lug member and hot end lug member define circumferentially spaced first and second sides of the lug assembly. A single main diaphragm extends radially from an inner end portion to an outer end portion, with the inner end portion being mounted to the lug front on the first side of the lug assembly. The outer end portion is mounted to a rotor shell which is spaced radially outward from the lug back. At least one intermediate diaphragm extends radially from an inner end portion, mounted to the lug back at a position intermediate the first and second sides of the lug assembly, to an outer end portion mounted to the rotor shell.

Preferably the rotor module includes multiple intermediate diaphragms mounted in circumferentially spaced relationship to the lug back. The inner end portion of the intermediate diaphragm circumferentially spaced furthest from the main diaphragm is mounted to lug back at the position intermediate the first and second sides of the lug assembly.

The lug front and the lug back are each rectangular plates having an arcuate shape, with the lug front and lug back being substantially coaxial. Similarly, the cold and hot end lug members each have substantially coaxial arcuate-shaped outboard edges.

The lug assembly also includes multiple circumferentially spaced stiffening plates, with each stiffening plate extending longitudinally between the cold end lug member and the hot end lug member and radially between the lug front and the lug back. The longitudinally opposite edges of the stiffening plates are mounted to the cold and hot end lug members and the radially opposite edges are mounted to the lug front and the lug back. The lug assembly also includes multiple longitudinally spaced stiffening members, with each of the stiffening members extending circumferentially between adjacent stiffening plates and radially between the lug front and the lug back. The circumferentially opposite edges of the stiffening members are mounted to the stiffening plates and the radially opposite edges of the stiffening members are mounted to the lug front and the lug back.

The rotor module also comprises cold end and hot end seal extensions extending longitudinally from the cold end and hot end lug members. The rotor module further comprises multiple radially spaced stay plate assemblies which extend circumferentially between the diaphragms.

It is an object of the invention to provide an air preheater rotor which is more easily assembled from multiple rotor modules.

It is also an object of the invention to provide a lower-cost rotor structure which requires less field-erection time.

It is further an object of the invention to provide an air preheater rotor having improved interchangeability of the basketed heat exchange element.

Other objects and advantages of the invention will become apparent from the drawings and specification.

BRIEF DESCRIPTION OF THE DRAWINGS

The present invention may be better understood and its numerous objects and advantages will become apparent to those skilled in the art by reference to the accompanying drawings in which:

FIG. 4 is a cross section view, taken along line 4—4 of FIG. 3;

FIG. 5 is an enlarged end view of the lug assembly of FIG. 3;

FIG. 6 is an enlarged cross section view, taken along line 6—6 of FIG. 3;

DETAILED DESCRIPTION OF THE PREFERRED EMBODIMENT

Figure 1:
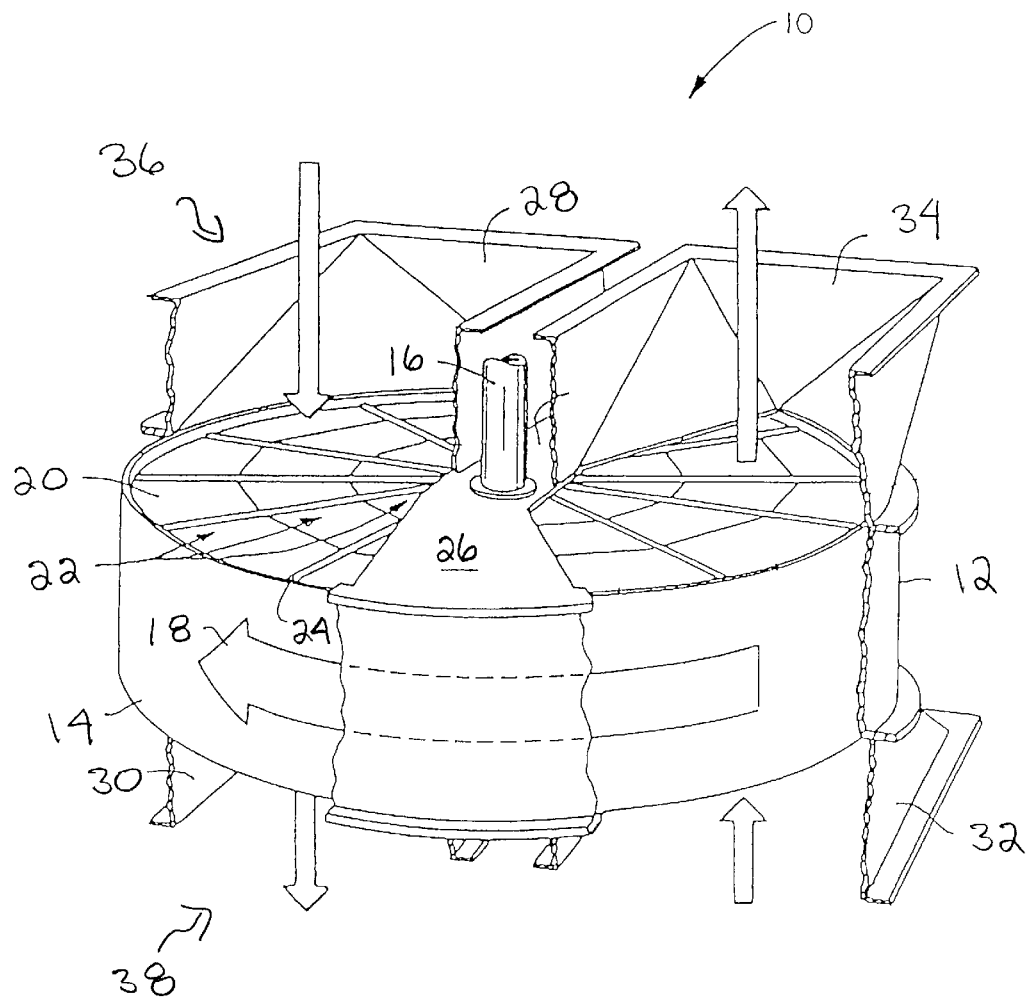
FIG. 1 is a general perspective view of a conventional rotary regenerative air preheater.

FIG. 1 of the drawings is a partially cut-away perspective view of a typical air preheater 10 showing a housing 12 in which the rotor 14 is mounted on drive shaft or post 16 for rotation as indicated by the arrow 18. The rotor is composed of a plurality of sectors 20 with each sector containing a number of basket modules 22 and with each sector being defined by the diaphragms 24. The basket modules 22 contain the heat exchange surface. The housing 12 is divided by means of the flow impervious sector plate 26 into a flue gas side and an air side. A corresponding sector plate is also located on the bottom of the unit. The hot flue gases enter the air heater through the gas inlet duct 28, flow through the rotor 14 where heat is transferred to the basket modules 22 and then exit through gas outlet duct 30. The countercurrent flowing air enters through air inlet duct 32, flows through the basket modules 22 where it picks up heat and then exits through air outlet duct 34. The gas inlet duct 28 and the air outlet duct 34 define a hot end 36 of the rotor 14 and the gas outlet duct 30 and air inlet duct 32 define a cold end 38 of the rotor 14.

Figure 2:
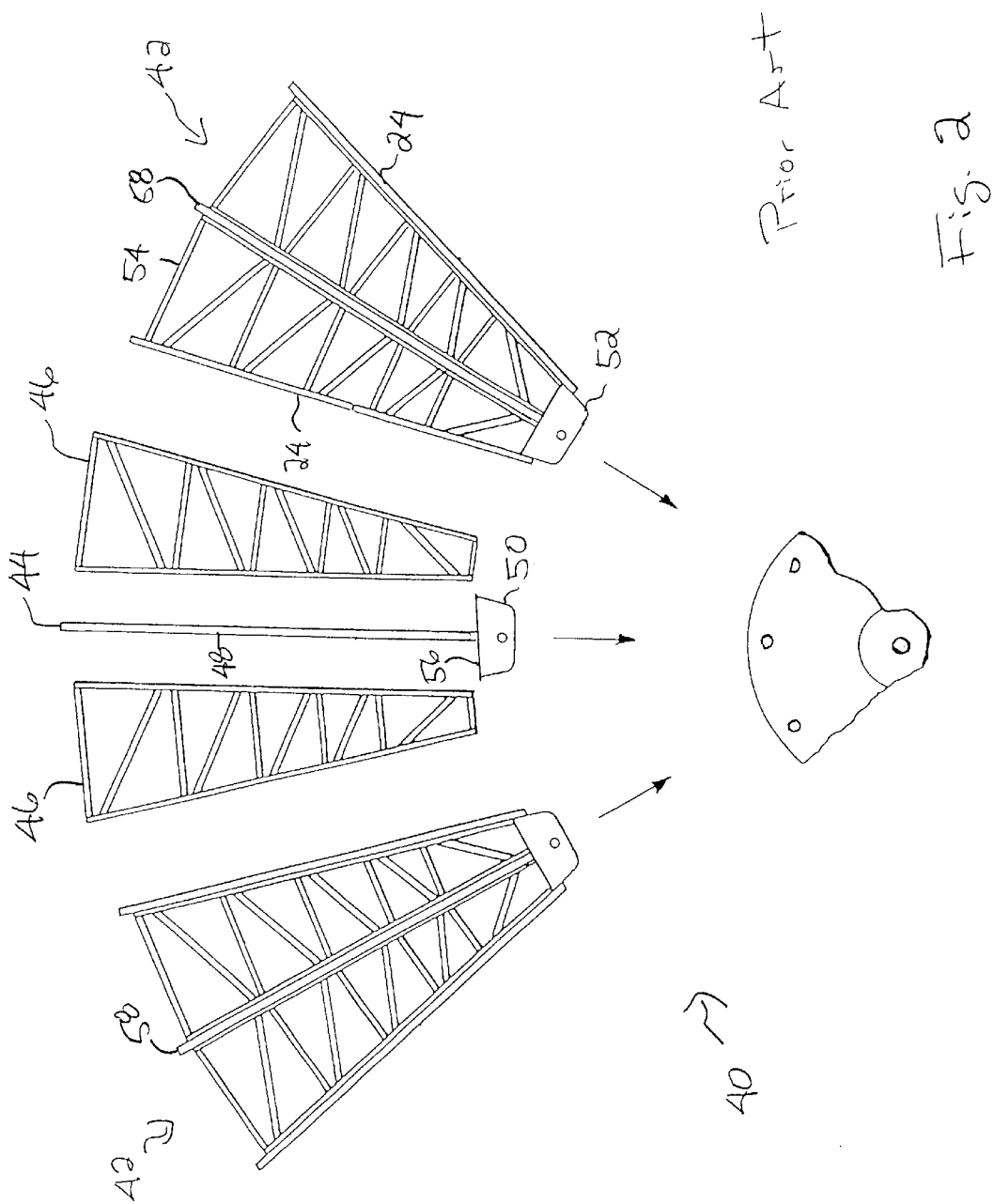
FIG. 2 is an exploded view of a portion of a conventional semi-modular rotor showing the shop assembled modules and the field installed components ready to be moved into position and attached to each other and to the rotor shaft.

Referring now to FIG. 2 which shows a plan view of a portion of conventional semi-modular rotor 40 assembled from a series of shop assembled modules 42 and a series of field assembled components which are located between the shop assembled modules 42 and which complete the rotor construction without any double diaphragms. The shop assembled modules 42 are attached to the rotor shaft or post 16 in spaced positions leaving an open space between them. The remaining components of the rotor 40 which are then field assembled are located in these spaces. The field assembled components comprise module lug and diaphragm assemblies 44 and may include grating assemblies 46. The modular lug and diaphragm assembly 44 includes a diaphragm 48, which is essentially the same as each of the intermediate diaphragms 58 of the shop assembled module 42 and a lug 50 which is essentially the same as the lug 52 of the shop assembled module 42. The grating assemblies 46 are essentially the same as the gratings 54 which form a part of the shop assembled modules 42. These gratings are attached to and between the shop assembled modules 42 and diaphragm 48 preferably by welding to complete the rotor structure. A grating 46 is located at each basket level within the rotor 40 the same as the gratings 54 in the shop assembled modules 42. The arrangement of shop assembled modules 42 and field assembled components continues all the way around the hub to form a complete rotor structure.

Reliance on field-labor to assemble the rotor increases the cost and the opportunity for assembly-related errors, compared to completely shop-built rotors. In addition, the conventional semi-modular rotor design has several inherent deficiencies/limitations. In the preferred embodiment, the design requires eighteen (18) module lugs 50, 52 per rotor 40, while it is possible to construct a non-semi-modular rotor having only nine (9) module lugs. The additional module lugs 50, 52 generate an otherwise unnecessary shop-assembly expense. The flat outboard side 56 of the module lug 50, 52 in combination with the arcuate rotor periphery requires intermediate diaphragms 58 having different radial lengths, increasing the cost and complexity of assembly. In addition, the rotor module lug geometry requires the use of asymmetrically-shaped baskets in the radially inboard layer if the remaining layers are to have a symmetrical shape. When it is desired to reverse the hot and cold faces of the basket (as is often done to prolong basket life), the asymmetric basket must be removed from its original sector, flipped, and placed in the adjacent sector, resulting in additional labor expenses.

Figure 3:
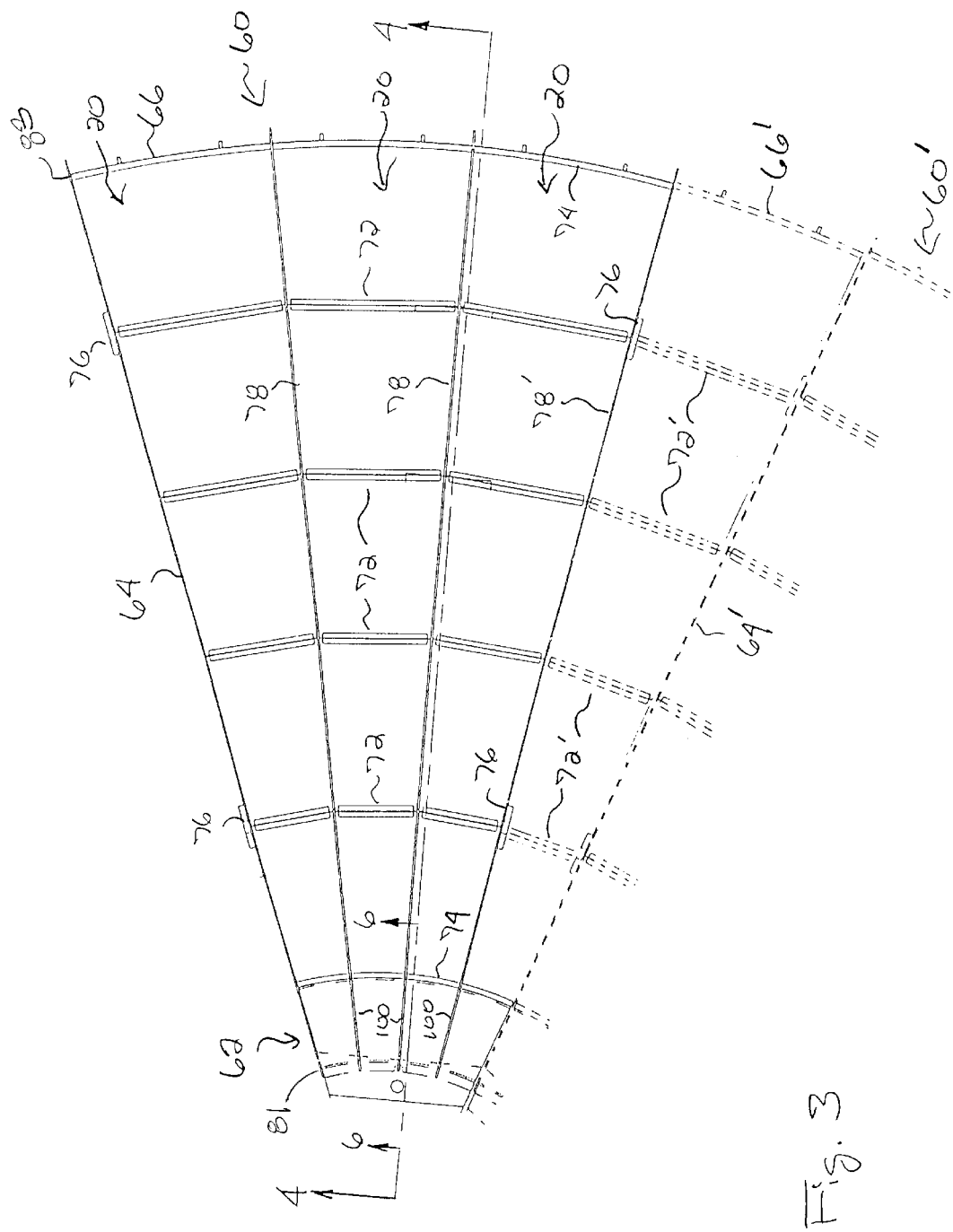
FIG. 3 is a top view, partly broken away, of a rotor module assembly in accordance with the invention, with a portion of an adjacent rotor module shown in phantom.

With reference to FIGS. 3 and 4, a rotor module 60 in accordance with the invention includes a lug assembly 62, a single main diaphragm 64, a rotor shell 66, hot and cold end seal extensions 68, 70, multiple stay plate assemblies 72, multiple basket support bars 74, multiple lifting lugs 76, and preferably multiple intermediate diaphragms 78. The rotor module 60 may also include grating assemblies (not shown). As shown in FIG. 2, the conventional shop assembled modules 42 included a main diaphragm 24 on each side of the module 42 while the field assembled components did not include any main diaphragms. In a rotor assembled from rotor modules 60, the main diaphragm 64 of each rotor module 60 extends radially from the lug front 80 to the rotor shell 66 on the same side of each of the rotor modules 60 (with the radially inner and outer end portions 81, 83 of the main diaphragm 64 being welded to the lug front 80 and rotor shell 66, respectively). As shown in FIG. 3, each rotor module 60 is mounted immediately next to each adjacent rotor module 60', with the space of the "missing" main diaphragm of each rotor module 60 being occupied by the main diaphragm 64' of an adjacent rotor module 60'. Accordingly, all of the rotor modules 60 are substantially identical, shop assembled units. The only field assembled components are the rotor shells 66', stay plate assemblies 72' and grating assemblies (as required) which extend between the "exposed" intermediate diaphragm 78' of each rotor module 60 and the main diaphragm 64' of each adjacent rotor module 60'. Therefore, the rotor modules 60 and field assembled components may be assembled into a rotor in much less time than the conventional semi-modular rotor 40.

To facilitate discussion, the lug assembly 62 of FIGS. 5 and 6 will be described as extending vertically from the lower, cold end lug member 82 to the upper, hot end lug member 84, for use in a vertical air preheater.

A radially inner lug front 80 and a radially outer lug back 86 each have a lower end 88, 90 welded to the inner surface 92 of the cold end lug member 82 and an upper end 94, 96 welded to the inner surface 98 of the hot end lug member 84. The lug front 80 and the lug back 86 are rectangular plates, formed to have an arcuate shape such that the lug fronts 80 and lug backs 86 of an assembled rotor from concentric circles around the post 16. To mechanically stiffen the lug assembly 62, three rectangular stiffening plates 100 extend vertically between the cold and hot end lug members 82, 84 and radially between the lug front 80 and the lug back 86, with the edges 102, 104, 106, 108 of the stiffening plates 100 being welded to the inner surfaces 92, 98, 110, 112 of the cold end lug member 82, the hot end lug member 84, the lug back 86, and the lug front 80. To provide additional rigidity, stiffening members 114 extend horizontally between adjacent stiffening plates 100 and radially between the lug front 80 and the lug back 86, with the edges 116, 118, 120, 122 of the stiffening members 114 being welded to the surfaces 124, 110, 112 of the stiffening plates 100, the lug back 86, and the lug front 80. The arcuate shape of the lug front 80 and lug back 86 provide a more rigid structure at equivalent radial locations than the flat-shape of comparable components of the conventional semi-modular rotor 40. Accordingly, fewer devices for stiffening the lug assembly 62 are required than in conventional semi-modular modules 42. In addition, the arcuate shape of the lug front 80 and lug back 86 permits the use of stiffening plates 100 and stiffening members 114 having a constant radial dimension. This provides reduced manufacturing costs and a simpler assembly process.

Figure 7:
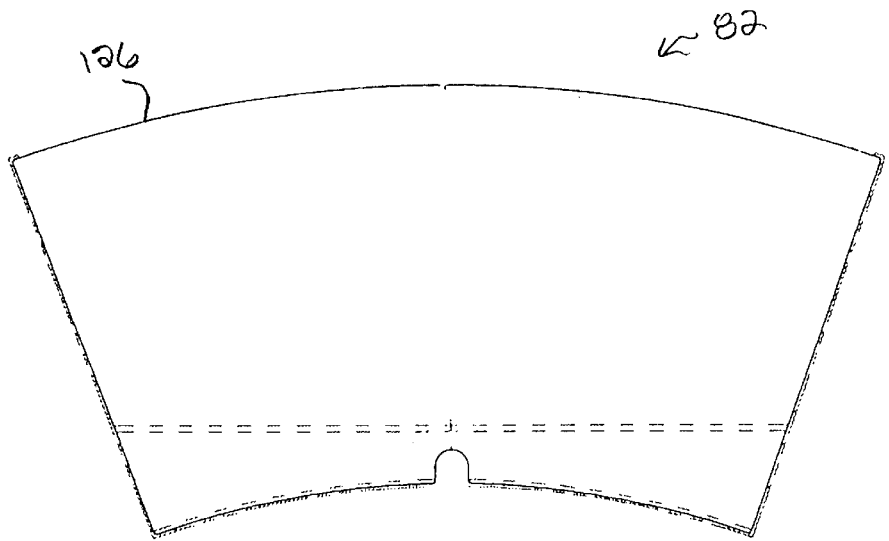
FIG. 7 is an enlarged top view, partly in phantom, of the cold end lug of the lug assembly of FIG. 6.
Figure 8:
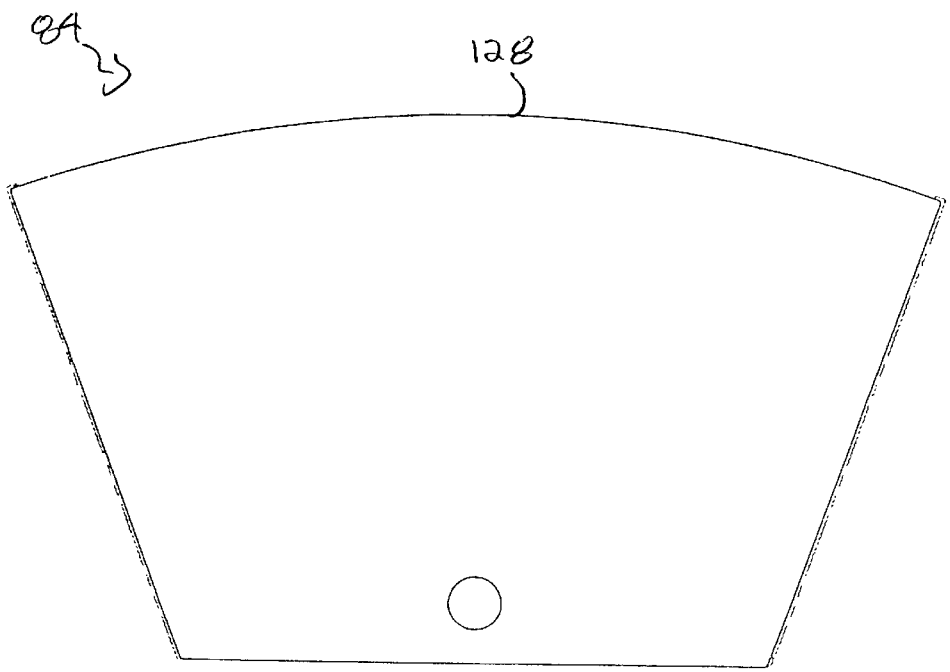
FIG. 8 is an enlarged top view of the hot end lug of the lug assembly of FIG. 6.

With reference to FIGS. 7 and 8, the outboard edges 126, 128 of the cold and hot end lug members 82, 84 have an arcuate shape. Similar to the lug front 80 and lug back 86, outboard edges 126 and 128 form circles around the post 16 in an assembled rotor. As shown in FIGS. 3 and 4, each rotor module 60 defines an arc-segment of an assembled rotor, with the lug front 80, the lug back 86, the outboard edges 126, 128 of the cold and hot end lug members 82, 84, and the rotor shell 66 all having complimentary arcuate shapes. For a line 130 extending from the post axis to the rotor shell 66, the line segment 132 between the lug back 86 and the rotor shell 66 will therefore have the same length 134 as the line segment 132 between the lug back 86 and the rotor shell 66 for any other such line 130. Since the intermediate diaphragms 78 extend from the lug back 86 to the rotor shell 66 (with the radially inner and outer end portions 136, 138 of the intermediate diaphragms 78 being welded to the lug back 86 and rotor shell 66, respectively), all of the intermediate diaphragms 78 have the same radial length 134, eliminating the cost associated with manufacturing intermediate diaphragms 78 having different lengths and reducing the complexity of assembly.

The ability to add additional sectors 20 to a rotor module 60 provides the potential to reduce the number of module lugs required to construct the rotor. That is, the size of the arc segment defined by the rotor module 60 may be increased to accommodate additional sectors 20, thereby reducing the number of rotor modules 60 of the assembled rotor. Since each rotor module 60 has only a single cold end lug member 82 and a single hot end lug member 84, the number of lugs is reduced. Accordingly, the amount of field time required to erect the rotor is also reduced.

The arcuate shape of the lug front 80, the lug back 86, and the outboard edges 126, 128 of the cold and hot end lug members 82, 84 permit the use of symmetrically-shaped baskets in the radially inboard layer. Such symmetrically-shaped baskets are easier to shop-assemble and easier to reverse in field, when operating practice requires that the hot and cold faces of the basket be rotated. A symmetrically-shaped basket does not have to be moved from one sector to another sector, to switch the hot and cold faces of the basket.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A semi-modular rotor module for an air preheater having a circular rotor, the rotor module comprising:
    a lug assembly including a lug front and a lug back spaced radially outward from the lug front, the lug front and lug back each extending longitudinally from a first end to a second end, the lug assembly also including a cold end lug member mounted to the first ends of the lug front and the lug back and a hot end lug member mounted to the second ends of the lug front and the lug back, the lug front, lug back, cold end lug member and hot end lug member defining circumferentially spaced first and second sides of the lug assembly;
    a rotor shell spaced radially outward from the lug back;
    a single main diaphragm extending radially from an inner end portion to an outer end portion, the inner end portion being mounted to the lug front on the first side of the lug assembly, the outer end portion being mounted to the rotor shell; and
    at least one intermediate diaphragm, each intermediate diaphragm extending radially from an inner end portion to an outer end portion, the inner end portion being mounted to lug back at a position intermediate the first and second sides of the lug assembly, the outer end portion being mounted to the rotor shell.

2. The rotor module of claim 1 comprising a plurality of intermediate diaphragms mounted in circumferentially spaced relationship to the lug back, the inner end portion of the intermediate diaphragm circumferentially spaced furthest from the main diaphragm being mounted to lug back at the position intermediate the first and second sides of the lug assembly.

3. The rotor module of claim 1 wherein the lug front and the lug back are each rectangular plates having an arcuate shape, the lug front and lug back being substantially coaxial.

4. The rotor module of claim 3 wherein the cold and hot end lug members each have an outboard edge having an arcuate shape, the outboard edges being substantially coaxial.

5. The rotor module of claim 1 wherein the lug assembly also includes a plurality of circumferentially spaced stiffening plates, each stiffening plate extending longitudinally between the cold end lug member and the hot end lug member and radially between the lug front and the lug back.

6. The rotor module of claim 5 wherein each of the stiffening plates has longitudinally opposite first and second edges mounted to the cold and hot end lug members, respectively, and radially opposite third and fourth edges mounted to the lug front and the lug back, respectively.

7. The rotor module of claim 5 wherein the lug assembly also includes a plurality of longitudinally spaced stiffening members, each of the stiffening members extending circumferentially between a one of the stiffening plates and an adjacent one of the stiffening plates and radially between the lug front and the lug back.

8. The rotor module of claim 7 wherein each of the stiffening plates has circumferentially opposite first and second edges mounted to the stiffening plates, respectively, and radially opposite third and fourth edges mounted to the lug front and the lug back, respectively.

9. The rotor module of claim 1 further comprising a cold end seal extension extending longitudinally from the cold end lug member and a hot end seal extension extending longitudinally from the hot end lug member.

10. The rotor module of claim 1 further comprising a plurality of radially spaced stay plate assemblies extending circumferentially between the main diaphragm and the intermediate diaphragm.

11. The rotor module of claim 1 further comprising a plurality of radially spaced stay plate assemblies extending circumferentially between the main diaphragm and the intermediate diaphragm and a plurality of radially spaced stay plate assemblies extending circumferentially between the each intermediate diaphragm and an adjacent intermediate diaphragm.

12. A semi-modular rotor module for an air preheater having a circular rotor, the rotor module comprising:

a lug assembly including a lug front and a lug back spaced radially outward from the lug front, the lug front and lug back each extending longitudinally from a first end to a second end, the lug assembly also including a cold end lug member mounted to the first ends of the lug front and the lug back and a hot end lug member mounted to the second ends of the lug front and the lug back, the lug front, lug back, cold end lug member and hot end lug member defining circumferentially spaced first and second sides of the lug assembly;

a rotor shell spaced radially outward from the lug back;

a single main diaphragm extending radially from an inner end portion to an outer end portion, the inner end portion being mounted to the lug front on the first side of the lug assembly, the outer end portion being mounted to the rotor shell; and a plurality of intermediate diaphragms, each intermediate diaphragm extending radially from an inner end portion to an outer end portion, the inner end portions being mounted in circumferentially spaced relationship to the lug back, the inner end portion of the intermediate diaphragm circumferentially spaced furthest from the main diaphragm being mounted to lug back at a position intermediate the first and second sides of the lug assembly, the outer end portion being mounted to the rotor shell.

13. A circular rotor for an air preheater comprising:

a plurality of substantially identical, adjacently positioned, shop built rotor modules, each rotor module including a lug assembly including a lug front and a lug back spaced radially outward from the lug front, the lug front and lug back each extending longitudinally from a first end to a second end, the lug assembly also including a cold end lug member mounted to the first ends of the lug front and the lug back and a hot end lug member mounted to the second ends of the lug front and the lug back, the lug front, lug back, cold end lug member and hot end lug member defining circumferentially spaced first and second sides of the lug assembly, a shop installed rotor shell spaced radially outward from the lug back, a single main diaphragm extending radially from an inner end portion to an outer end portion, the inner end portion being mounted to the lug front on the first side of the lug assembly, the outer end portion being mounted to the shop installed rotor shell, a plurality of intermediate diaphragms, each intermediate diaphragm extending radially from an inner end portion to an outer end portion, the outer end portion being mounted to the shop installed rotor shell, the inner end portions being mounted in circumferentially spaced relationship to the lug back, the inner end portion of an exposed intermediate diaphragm circumferentially spaced furthest from the main diaphragm being mounted to lug back at a position intermediate the first and second sides of the lug assembly, and a plurality of radially spaced, shop installed stay plate assemblies, at least one shop installed stay plate assembly extending circumferentially between the main diaphragm and an adjacent intermediate diaphragm and at least one shop installed stay plate assembly extending circumferentially between the each intermediate diaphragm and an adjacent intermediate diaphragm;

a plurality of field installed rotor shells; and a plurality of field installed stay plate assemblies;

wherein a field installed rotor shell and at least one field installed stay plate assembly extends circumferentially between the main diaphragm of each rotor module and the exposed intermediate diaphragm of each adjacent rotor module.

* * * * *